(12) United States Patent
Chen et al.

(10) Patent No.: US 10,672,149 B2
(45) Date of Patent: Jun. 2, 2020

(54) HEAD MOUNTED DISPLAY DEVICE AND PROCESSING METHOD OF HEAD MOUNTED DISPLAY DEVICE

(71) Applicant: HUAWEI TECHNOLOGIES CO., LTD., Shenzhen, Guangdong (CN)

(72) Inventors: Xin Chen, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/311,311

(22) PCT Filed: Jun. 22, 2016

(86) PCT No.: PCT/CN2016/086766
§ 371 (c)(1),
(2) Date: Dec. 19, 2018

(87) PCT Pub. No.: WO2017/219288
PCT Pub. Date: Dec. 28, 2017

(65) Prior Publication Data
US 2019/0206093 A1    Jul. 4, 2019

(51) Int. Cl.
*G06T 11/00* (2006.01)
*G06F 3/14* (2006.01)
(Continued)

(52) U.S. Cl.
CPC ............ *G06T 11/00* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 8,818,274 B2    8/2014    Grob et al.
8,971,811 B2    3/2015    Grob et al.
(Continued)

FOREIGN PATENT DOCUMENTS

CN          1940635 A      4/2007
CN          102625981 A    8/2012
(Continued)

OTHER PUBLICATIONS

International Search Report and Written Opinion issued in International Application No. PCT/CN2016/086766 dated Mar. 23, 2017, 20 pages.
(Continued)

*Primary Examiner* — Yanna Wu
(74) *Attorney, Agent, or Firm* — Fish & Richardson P.C.

(57) ABSTRACT

This application discloses a head mounted display device for extending a display area of an electronic device and a processing method of the head mounted display device. A display of the electronic device displays first content of an image. The image further includes second content that is not displayed on the display of the electronic device. The head mounted display device obtains, by using an image sensor, the first content displayed on the display of the electronic device, performs projection transformation on the second content, and displays the obtained first content and the second content obtained after the projection transformation on the display of the head mounted display device.

10 Claims, 6 Drawing Sheets

(51) Int. Cl.
  *G06F 3/01* (2006.01)
  *G02B 27/01* (2006.01)
  *G06F 3/0487* (2013.01)
  *G06T 3/00* (2006.01)

(52) U.S. Cl.
  CPC ............ *G06F 3/012* (2013.01); *G06F 3/0487* (2013.01); *G06F 3/1423* (2013.01); *G06T 3/0012* (2013.01); *G02B 2027/014* (2013.01); *G02B 2027/0134* (2013.01); *G02B 2027/0138* (2013.01); *G02B 2027/0147* (2013.01); *G02B 2027/0178* (2013.01); *G02B 2027/0187* (2013.01); *G09G 2354/00* (2013.01); *G09G 2370/16* (2013.01)

(56) References Cited

U.S. PATENT DOCUMENTS

| | | |
|---|---|---|
| 2012/0249587 A1 | 10/2012 | Anderson et al. |
| 2014/0327786 A1 | 11/2014 | Grob et al. |
| 2014/0347289 A1* | 11/2014 | Suh .................. G06F 3/017 345/173 |
| 2015/0199849 A1 | 7/2015 | Cho et al. |
| 2015/0293362 A1 | 10/2015 | Takahashi et al. |
| 2017/0075429 A1 | 3/2017 | Bromer |

FOREIGN PATENT DOCUMENTS

| | | |
|---|---|---|
| CN | 103534665 A | 1/2014 |
| CN | 103635869 A | 3/2014 |
| CN | 103941870 A | 7/2014 |
| CN | 104781873 A | 7/2015 |
| CN | 105247450 A | 1/2016 |
| JP | H0784211 A | 3/1995 |
| JP | 2003091353 A | 3/2003 |
| WO | 2015046669 A1 | 4/2015 |

OTHER PUBLICATIONS

Office Action issued in Chinese Application No. 201680037022.2 dated Nov. 1, 2019, 10 pages.

\* cited by examiner

HEAD MOUNTED DISPLAY DEVICE AND PROCESSING METHOD OF HEAD MOUNTED DISPLAY DEVICE

CROSS-REFERENCE TO RELATED APPLICATIONS

This application is a National Stage of International Application No. PCT/CN2016/086766, filed on Jun. 22, 2016, which is hereby incorporated by reference in its entirety.

TECHNICAL FIELD

The present invention relates to the communications field, and in particular, to a head mounted display device (HMD) for extending a display area of an electronic device and a processing method of the head mounted display device.

BACKGROUND

With improvement of science and technology, electronic devices such as a smartphone, a tablet computer, and a smartwatch play an increasingly important role in human life. Because a display area of the electronic device is usually limited, when image resolution of an image to be displayed on the electronic device is greater than display resolution of a display of the electronic device, the to-be-displayed image needs to be scaled down or cropped.

The display resolution (screen resolution) is a quantity of pixels that can be displayed on the display, for example, common display resolution of a 2k display is 2560×1440. The image resolution is a quantity of horizontal pixelsxa quantity of vertical pixels of the image, for example, image resolution photographed by an image sensor with eight million pixels is 3200×2400. When the image resolution is greater than the display resolution, to display the entire image on the display, the image needs to be cropped or compressed. Therefore, use is inconvenient, and user experience is affected.

SUMMARY

For the foregoing technical problem, an objective of the present invention is to provide a head mounted display device for extending a display area of an electronic device and a processing method of the head mounted display device. When a size of an image to be displayed on the electronic device is greater than a maximum image size supported by a display of the electronic device, the head mounted display device displays image content exceeding the display of the electronic device, so as to extend the display area of the electronic device.

According to a first aspect, a method is provided, applied to a head mounted display device with a display and an image sensor, where the method includes: establishing a connection to an electronic device, where the electronic device has a display, a defined three-dimensional coordinate system, and a feature point that has known three-dimensional coordinates in the three-dimensional coordinate system, the display of the electronic device displays first content of an image, image resolution of the image is greater than display resolution of the display of the electronic device, and the image further includes second content that is not displayed on the display of the electronic device; receiving data sent by the electronic device, where the data includes a grayscale value of each pixel in the second content, and performing projection transformation on the second content according to the three-dimensional coordinates of the feature point and the grayscale value; obtaining, by using the image sensor, the first content displayed on the display of the electronic device; and displaying, on the display of the head mounted display device, the obtained first content and the second content obtained after the projection transformation. A display area of the electronic device can be extended by using the foregoing method.

In a possible design, before the first content and the second content are displayed on the display of the head mounted display device, the method further includes: tracking the feature point, and calculating a posture of the image sensor relative to the display of the electronic device. When a relative movement occurs between the electronic device and the head mounted display device, the first content and the second content may be aligned.

In a possible design, the image includes a document and a virtual keyboard used to edit the document. The electronic device may display the virtual keyboard operated by a user with two hands, so as to improve an input speed.

In a possible design, the image includes a static image or a dynamic image. When a high-resolution movie is played on the electronic device, a display area may be extended by using the HMD.

According to a second aspect, a head mounted display device is provided, where the head mounted display device includes a unit configured to execute the method provided in the first aspect or any possible implementation of the first aspect.

According to a third aspect, a computer readable storage medium that stores one or more programs is provided, the one or more programs include an instruction, and when the instruction is executed by a head mounted display device, the head mounted display device performs the method provided in the first aspect or any possible implementation of the first aspect.

According to a fourth aspect, a head mounted display device is provided, the head mounted display device may include one or more processors, a memory, a display, a bus system, a transceiver, and one or more programs, and the processor, the memory, the display, and the transceiver are connected by using the bus system; and the one or more programs are stored in the memory, the one or more programs include an instruction, and when the instruction is executed by the head mounted display device, the head mounted display device performs the method provided in the first aspect or any possible implementation of the first aspect.

According to a fifth aspect, an embodiment of the present invention provides a graphical user interface on a head mounted display device, the head mounted display device includes a memory, a plurality of application programs, and one or more processors configured to execute one or more programs stored in the memory, and the graphical user interface includes a user interface displayed in the method provided in the first aspect or any possible implementation of the first aspect.

Optionally, the following possible designs may be combined with the first aspect to the fifth aspect of the present invention.

In a possible design, the electronic device has n feature points used for coordinate transformation, and n is an integer not less than 4.

In a possible design, the image is a web page, and on a smartwatch with a limited display area, a user may also obtain web browsing experience similar to that on a computer.

By using the foregoing technical solution, the display area of the electronic device may be extended.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. The following descriptions are merely examples of embodiments of the present invention, but are not intended to limit the present invention. Any modification, equivalent replacement, or improvement made without departing from the spirit and principle of the present invention should fall within the protection scope of the present invention.

It should be understood that when ordinal numbers such as "first" and "second" are mentioned in the embodiments of the present invention, they are merely used for distinguishing unless they definitely show a sequence according to context.

A head mounted display device (HMD, Head-Mounted Display) or another near-eye display device may be configured to present an augmented reality (AR, Augmented Reality) view of a background scene to a user. A real object and a virtual object are mixed in the augmented reality view. The real object in the augmented reality view may include various electronic devices that communicate with the HMD, and content displayed on the electronic devices.

The head mounted display device uses various protocols to perform wired or wireless communication with the electronic device, and may use the various protocols to send and receive data. Some examples of wireless communications technologies may include Wi-Fi, Bluetooth (Bluetooth), radio frequency identification (RFID), the Infrared Data Association (IrDA), ultra-wideband (UWB), ZigBee (ZigBee), D2D (Device-to-Device), or the like.

Figure 1:
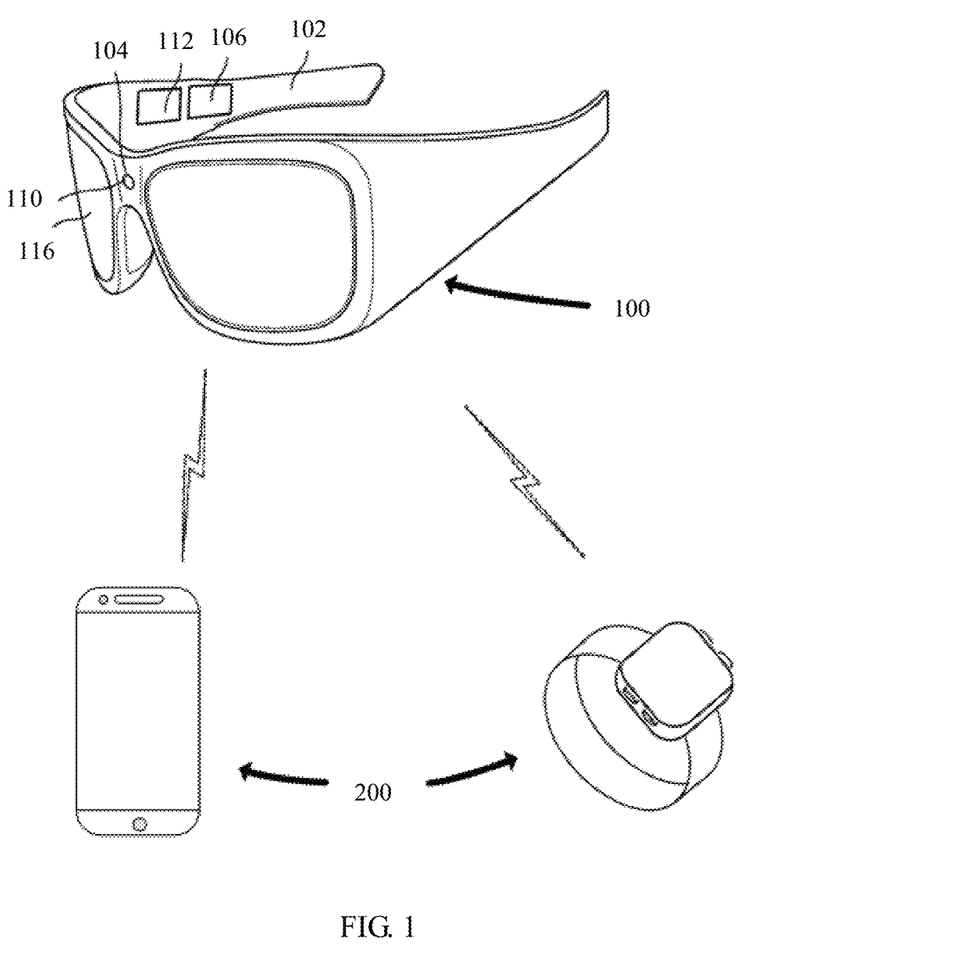
FIG. 1 is a schematic diagram in which an HMD performs wireless communication with an electronic device according to an embodiment of the present invention.

FIG. 1 shows a schematic diagram in which a head mounted display device 100 (HMD 100) performs wireless communication with electronic devices 200.

The head mounted display device 100 shown in FIG. 1 is a shape of a head mounted spectacle frame, and includes a temple 102 and a nose bridge 104. The head mounted display device disclosed in the present invention may use any suitable form, including but not limited to a near-eye device such as the head mounted display device 100 in FIG. 1. For example, the head mounted display device may further be a single-eye device or a head mounted helmet structure.

The electronic devices 200 shown in FIG. 1 use forms of a mobile phone and a smartwatch. However, the term "electronic device" mentioned in the present invention may include a portable communications device that may include another function such as a personal digital assistant (PDA) function and/or a portable multimedia player (PMP) function, for example, an electronic paper, an ebook, a computer, an in-vehicle display, a tablet computer, a smartphone, and a smartwatch.

An example in an embodiment of a portable electronic device includes but is not limited to a portable electronic device using iOS®, Android®, Windows Phone®, or another operating system. It should be further understood that, in some embodiments, the electronic device is a desktop computer or a projector instead of a portable communications device.

In the present invention, a wireless connection may be established between the HMD 100 and a communications unit of the electronic device 200. A manner of the wireless connection is a pairing connection. In this case, pairing indicates a connection to send and receive data between the HMD 100 and the electronic device 200. When the pairing is performed, the HMD 100 and the electronic device 200 perform communication access, and can send data to and receive data from each other. The pairing may be performed by means of Bluetooth, near field communication (NFC), and the like. In the present invention, the HMD 100 and the electronic device 200 are described in a case in which a connection is established between the HMD 100 and the electronic device 200.

The HMD 100 provides an image for eyes of a user by using a display described in the following. The image includes: an image that is collected by an image sensor of the HMD100 and displayed on the electronic device 200, and an image processed by a processor of the HMD 100.

The electronic device 200 has a predefined three-dimensional coordinate system. The electronic device further has a feature point that has known three-dimensional coordinates in the three-dimensional coordinate system. When the electronic device 200 receives a to-be-displayed image, or when a user magnifies an image that is currently displayed on the display of the electronic device 200, the electronic device 200 determines whether image resolution of the image is greater than display resolution of the display of the electronic device 200. If the image resolution of the image is less than or equal to the display resolution of the display, the image is normally displayed on the display of the electronic device 200. If the image resolution of the image is greater than the display resolution of the display, a part of content of the image is displayed on the display of the electronic device 200, then a part of the image that exceeds a range of the display is determined, and data that includes a grayscale value of each pixel in the exceeded part is sent to the HMD 100. The HMD 100 calculates a transformation matrix from the display of the electronic device 200 to the HMD 100 according to the feature point of the electronic device 200, and performs, by using the transformation matrix, projection transformation on the part that exceeds the range of the display of the electronic device 200.

After the connection is established between the HMD 100 and the electronic device 200, the electronic device 200 first sends parameter information to the HMD 100. The parameter information includes a point distance of the display of the electronic device 200, a quantity of horizontal pixels on the display, a quantity of vertical pixels on the display, a definition of the three-dimensional coordinate system (including a coordinate axis direction and a location of an origin), coordinates of a display center in the three-dimensional coordinate system, coordinates of the feature point in the three-dimensional coordinate system, and the like.

A feature point in an image is usually a point that can be easily detected because the point is located in an area in which a grayscale changes greatly and is relatively easy to be distinguished from a surrounding pixel area, for example, a corner point (Corner) of a rectangular frame in the image. Generally, these points may be described by using a feature descriptor (Feature Descriptor) obtained by means of calculation by using a point in a surrounding area of these points. A commonly-used feature descriptor is SIFT (Scale-Invariant Feature Transform, scale-invariant feature transform), SURF (Speeded Up Robust Features, speeded up robust features), a HOG (Histogram of Oriented Gradients, histogram of oriented gradient), or the like. The feature descriptor is usually a vector. Whether two feature points match may be determined by detecting feature points in different images and calculating similarity (for example, a Euclidean distance) between descriptors of a pair of feature points, so that the feature point are tracked in different frame images.

Before delivery, the electronic device 200 in the present invention has n feature points used for coordinate transformation. The n feature points can be extracted in various light and deformation cases, and can be tracked in each frame image, and n is an integer not less than 4.

Preferably, the n feature points are corner points on a frame of the electronic device 200.

The HMD 100 photographs the electronic device 200 by using the image sensor (described in detail in the following). In the photographed image, preset feature points on the electronic device 200 are tracked by using a feature point tracking technology. Three-dimensional coordinates of the preset feature points are known, and two-dimensional coordinates of the preset feature points in the photographed image can be obtained by using the feature point tracking technology. Three-dimensional coordinates of each feature point and two-dimensional coordinates of each feature point in the photographed image may form a 3D-2D coordinate pair. The HMD 100 may obtain a transformation matrix T with six degrees of freedom by means of calculation by using at least four 3D-2D coordinate pairs. The transformation matrix T is a transformation matrix from a three-dimensional coordinate system of the electronic device 200 to a three-dimensional coordinate system of the HMD 100. The transformation matrix T may be represented as a homogeneous transformation matrix 4×4 shown in Formula (1):

$$T = \begin{bmatrix} R & t \\ 0 & 1 \end{bmatrix} \quad \text{Formula (1)}$$

In Formula (1), R is a 3×3 orthogonal rotation matrix, and t is a 3×1 panning vector. When at least four 3D-2D coordinate pairs and a calibration matrix K of the HMD 100 are known, R and t in the transformation matrix T may be estimated by minimizing a 3D-2D projection error. The calibration matrix K of the HMD 100 is a parameter known before delivery of the HMD 100.

Coordinates $(x_c, y_c, z_c)$ of the display center of the electronic device 200 are known, a pixel point distance of the display of the electronic device 200 is d (mm), and a quantity of horizontal/vertical pixels on the display of the electronic device 200 is (w, h). It is assumed that an origin of the three-dimensional coordinate system of the display of the electronic device 200 is located at the display center, and a plane on which the display is located is a z=0 plane, a pixel range covered by the electronic device 200 is determined by a rectangle formed by using $P1=(x_c-w/2, y_c-h/2)^T$, $P2=(x_c-w/2, y_c+h/2)^T$, $P3=(x_c-w/2, y_c-h/2)^T$, and $P4=(x_c-w/2, y_c+h/2)^T$ as corner points. A pixel exceeding the range is considered to be outside the display of the electronic device 200. A column vector $(x_c-w/2, y_c-h/2)^T$ is a transpose of a row vector $(x_c-w/2, y_c-h/2)$, a column vector $(x_c-w/2, y_c+h/2)^T$ is a transpose of a row vector $(x_c-w/2, y_c+h/2)$, a column vector $(x_c+w/2, y_c-h/2)^T$ is a transpose of a row vector $(x_c+w/2, y_c-h/2)$, and a column vector $(x_c+w/2, y_c+h/2)^T$ is a transpose of a row vector $(x_c+w/2, y_c+h/2)$.

Coordinates that are of any pixel P located outside the display of the electronic device 200 and that are in the three-dimensional coordinate system of the electronic device may be represented as $P=(x-x_c, y-y_c, 0)^T*d$.

In Formula (1), the orthogonal rotation matrix R may be represented by three 3×1 column vectors, as shown in Formula (2):

$$R = [r_1\ r_2\ r_3] \quad \text{Formula (2)}$$

Homogeneous coordinates $\bar{p}$ obtained by projecting any pixel P outside the display of the electronic device 200 to a point P in a two-dimensional image of the HMD 100 may be represented in Formula (3):

$$\begin{aligned}
\bar{p} &= d * [K\ \ 0] * [r_1\ \ r_2\ \ r_3] * \begin{bmatrix} x - x_c \\ y - y_c \\ 0 \end{bmatrix} + t \\
&= d * [K\ \ 0] * [r_1\ \ r_2] * \begin{bmatrix} x - x_c \\ y - y_c \end{bmatrix} + t \\
&= [K\ \ 0] \begin{bmatrix} d*[r_1\ \ r_2] & t \\ 0 & 1 \end{bmatrix} * \begin{bmatrix} x - x_c \\ y - y_c \\ 1 \end{bmatrix} \\
&= [d*K*[r_1\ \ r_2]\ \ K*t] * \begin{bmatrix} x - x_c \\ y - y_c \\ 1 \end{bmatrix}
\end{aligned} \quad \text{Formula (3)}$$

In this way, any point in an image outside the display of the electronic device 200 and a transformation matrix H on the two-dimensional image displayed on the HMD 100 may be represented in Formula (4):

$$H = [d*K*[r_1\ r_2]\ K*t] \quad \text{Formula (4)}$$

Formula (4) may be used for backward warping (Backward Warping) calculation, so as to determine a grayscale value of each point in the two-dimensional image that needs to be displayed on the HMD 100 and that exceeds the display of the electronic device 200.

When the backward warping calculation is performed, a projection range on the head mounted device that is projected by an image range displayed on the display of the electronic device 200 is determined by a quadrilateral formed by four corner points P1'=H*P1$^h$, P2'=H*P2$^h$, P3'=H*P3$^h$, and P4'=H*P4$^h$. The backward warping calculation is not required for a pixel inside the quadrilateral, and a grayscale value of the pixel is determined by the image that is of the display of the electronic device 200 and that is obtained by the HMD 100. The backward warping calculation is required for a pixel outside the quadrilateral. P1$^h$, P2$^h$, P3$^h$, and P4$^h$ respectively represent homogeneous coordinates of P1 to P4: P1$^h$=(P1$^T$, 1)$^T$, P2$^h$=(P2$^T$, 1)$^T$, P3$^h$=(P3$^T$, 1)$^T$, and P4$^h$=(P4$^T$, 1)$^T$.

Figure 2:
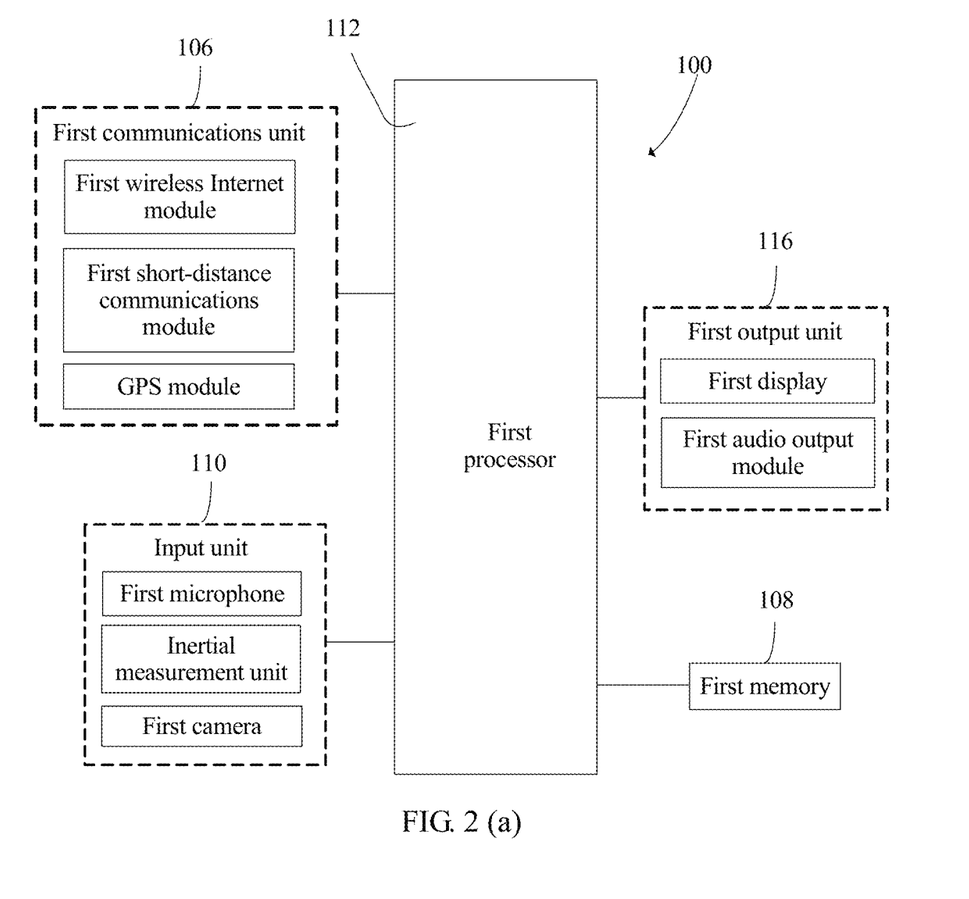
FIG. 2(a) is a schematic structural diagram of an HMD according to an embodiment of the present invention.
FIG. 2(b) is a schematic structural diagram of an electronic device according to an embodiment of the present invention.

The following describes more details of the head mounted display device 100 and the electronic device 200 with reference to FIG. 2(a) and FIG. 2(b).

FIG. 2(a) and FIG. 2(b) show the head mounted display device 100 and the electronic device 200 that have various components, but it should be understood that implementation of the head mounted display device 100 and the electronic device 200 does not necessarily need all components shown in the figure. The head mounted display device 100 and the electronic device 200 may be implemented by using more or fewer components.

As shown in FIG. 2(a), the head mounted display device 100 includes a first communications unit 106, a first memory 108, an input unit 110, a first processor 112, a first output unit 116, and the like.

Each of the foregoing components is explained in the following.

The first communications unit 106 usually includes one or more components. The component supports wireless communication between the head mounted display device 100 and the electronic device 200, to transmit a command and data. The data includes a grayscale value of each pixel in content that is not displayed on the display of the electronic device 200. The component may also support wireless communication between the head mounted display device 100 and a wireless communications system or a network of the head mounted display device. The component further supports communication between a plurality of head mounted display devices 100. For example, the first communications unit 106 may include at least one of a first wireless Internet module or a first short-distance communications module.

The first wireless Internet module supports the head mounted display device 100 in accessing the wireless Internet. Herein, as a wireless Internet technology, wireless local area network (WLAN), Wi-Fi, wireless broadband (WiBro), Worldwide Interoperability for Microwave Access (Wimax), and High Speed Downlink Packet Access (HSDPA), and the like may be used.

The first short-distance communications module is a module configured to support short-distance communication. Some examples of short-distance communications technologies may include Bluetooth (Bluetooth), radio frequency identification (RFID), the Infrared Data Association (IrDA), ultra-wideband (UWB), ZigBee (ZigBee), D2D (Device-to-Device), or the like.

The first communications unit 106 may further include a GPS (Global Positioning System) module. The GPS module receives radio waves from a plurality of GPS satellites (not shown) on the Earth orbit, and may calculate a position of the head mounted display device 100 by using an arrival time from the GPS satellite to the head mounted display device 100.

The input unit 110 is configured to receive an audio signal or a video signal. The input unit 110 may include a first microphone, an inertial measurement unit (IMU), and a first camera.

The first microphone may receive a sound corresponding to a sound control command of a user and/or a sound generated in an ambient environment of the head mounted display device 100, and process a received sound signal into an electrical voice data. The first microphone may use any one of various noise removal algorithms to remove noise generated when an external sound signal is received.

The inertial measurement unit (IMU) is configured to: detect a position, a direction, and an acceleration (pitching, rolling, and yawing) of the head mounted display device 100, and determine a relative position relationship between the head mounted display device 100 and the electronic device 200 by means of calculation. The inertial measurement unit (IMU) includes an inertial sensor such as a three-axis magnetometer, a three-axis gyroscope, or a three-axis accelerometer.

The first camera processes, in a video capture mode or an image capture mode, image data of a video or a static image obtained by using an image sensor, so as to obtain content displayed on the electronic device 200 and a feature point on the electronic device 200. Optionally, the first camera includes a depth camera and an RGB camera (also referred to as a color camera).

The depth camera is configured to: capture a depth image information sequence, and construct a three-dimensional model of a background scene and/or physical space. The depth image information may be obtained by using any suitable technology, including but not limited to a flight time, a structured light, and a stereoscopic image. According to a depth sensing technology, the depth camera may need additional components (for example, when the depth camera detects an infrared structured light pattern, an infrared light transmitter needs to be disposed), although these additional components may not necessarily be in a same position as the depth camera.

The RGB camera (also referred to as a color camera) is configured to capture an image information sequence at a visible light frequency.

Two or more depth cameras and/or RGB cameras may be provided according to configuration of the head mounted display device 100.

The first output unit 116 is configured to provide output (for example, an audio signal, a video signal, an alarm signal, and a vibration signal) in a visual, an auditory, and/or a tactile manner. The first output unit 116 may include a first display and a first audio output module.

As shown in FIG. 1, the first display includes an eyeglass formed by a lens, so that an image obtained after the following projection transformation may be displayed by using the lens (for example, by means of projection on the lens, by using a waveguide system included in the lens, and/or in any other suitable manner). A transparent lens may be used to support a user in viewing an image by using the lens. When the image is displayed in a projection manner, the first display may further include a micro projector not shown in the figure. The micro projector is used as an input light source of an optical waveguide eyeglass to provide a light source for displayed content. The first display outputs an image signal related to a function executed by the head mounted display device 100, for example, an image that is of the electronic device 200 and that is obtained by the first camera, and an image obtained after the projection transformation.

The first audio output module outputs audio data that is received from the first communications unit 106 or stored in the first memory 108. In addition, the first audio output module outputs a sound signal related to a function executed by the head mounted display device 100, for example, a receiving tone or a notification tone of a sound control command. The first audio output module may include a speaker, a receiver, or a buzzer.

The first processor 112 may control overall operations of the head mounted display device 100, and perform control and processing associated with display, the foregoing coordinate system transformation, the foregoing backward warping calculation, grayscale rendering, voice interaction, and the like. The first processor 112 may further calculate a posture of the head mounted display device 100 relative to the electronic device 200 (or the display of the electronic device 200).

The first processor 112 may calculate, according to the image captured by the first camera, a posture of the HMD 100 relative to the electronic device 200, and determine, according to a calculation result, content displayed on the first display.

The first memory 108 may store a software program of processing and control operations executed by the first processor 112, and may store input or output data, for example, received parameter information of the electronic device 200. In addition, the first memory 108 may further store data related to an output signal of the first output unit 116.

As shown in FIG. 2(b), the electronic device 200 includes a second communications unit 202, an A/V input unit 204, a user input unit 206, a second memory 208, a second output unit 210, and a second processor 212.

The second communications unit 202 usually includes one or more components. The component supports wireless communication between the electronic device 200 and the head mounted display device 100. The component may also support wireless communication between the electronic device 200 and a wireless communications system or a network of the electronic device. The component further allows wireless communication between a plurality of electronic devices 200. For example, the second communications unit 110 may include at least one of a broadcast receiving module, a mobile communications module, a second wireless Internet module, a second short-distance communications module, or a location positioning module. The second wireless Internet module and the second short-distance communications module respectively have a structure similar to a structure of the first wireless Internet module and a structure similar to a structure of the first short-distance communications module.

The broadcast receiving module receives a broadcast signal and/or broadcast-related information from an external broadcast management server by using a broadcast channel. The broadcast channel includes a satellite channel and/or a terrestrial channel. The broadcast management server is a server configured to generate and transmit a broadcast signal and/or broadcast-related information; or receive generated broadcast signal and/or broadcast-related information, and transmit the generated broadcast signal and/or broadcast-related information to a server of the electronic device. The broadcast signal may include a TV broadcast signal, a radio broadcast signal, or a data broadcast signal, and may further include a broadcast signal obtained by combining the data broadcast signal with the TV broadcast signal or the radio broadcast signal.

The mobile communications module transmits a radio signal to or receives a radio signal from at least one of a base station, an external terminal, or a server on a mobile communications network. The radio signal may include a voice call signal, a video call signal, or various types of data signals corresponding to text/multimedia message transmission and reception.

The location positioning module is a module configured to identify or obtain a location of the electronic device 200 in another manner. The location positioning module may obtain location information by using a Global Navigation Satellite System (GNSS). Herein, the GNSS is a radio navigation satellite system that circles the Earth and transmits a reference signal, so that some types of locations of radio navigation receivers on a surface of the Earth may be determined or roughly estimated. The GNSS includes a global positioning system (GPS) managed by the United States, Galileo managed by Europe, a Global Navigation Satellite System (GLONASS) managed by Russia, COMPASS managed by China, and a quasi-zenith satellite system (QZSS) managed by Japan.

The A/V input unit 204 is configured to receive an audio signal or a video signal. The A/V input unit 204 may include a second camera and a second microphone. The second camera processes, in a video capture mode or an image capture mode, image data of a video or a static image obtained by using an image capture apparatus. The processed image may be displayed on the following second display.

The image processed by the second camera may be stored in the following second memory 208 or transmitted to the head mounted display device 100 by using the second communications unit 202. Two or more second cameras may be provided according to configuration of the electronic device 200.

The second microphone may receive a sound (an audio signal) when the electronic device 200 is in a specific mode (such as a telephone call mode, a record mode, and a voice recognition mode). The audio signal is processed into digital data, and the digital data may be output and converted into a format that can be sent to a mobile communications base station by using the mobile communications module in a telephone call mode. The second microphone may implement various types of noise cancellation (or suppression) algorithms to cancel (or suppress) noise or interference generated in a process of receiving and transmitting an audio signal.

The user input module 206 may generate input data according to a command input by a user, so as to control various operations of the electronic device 200. The user input unit 206 supports the user in inputting various types of information, and may include a keyboard, a dome switch (a dome switch), a touch panel (for example, a touch sensitive component for detecting a change in resistance, pressure, capacitance, and the like because of contact), a scroll wheel (jog wheel), a rocker switch (jog switch), and the like.

The second output unit 210 is configured to provide output (for example, an audio signal, a video signal, an alarm signal, and a vibration signal) in a visual, an auditory, and/or a tactile manner. The second output unit 210 may include a second display, a second audio output module, an alarm unit, a tactile module, and the like.

The second monitor may display information processed in the electronic device 200. For example, when the electronic device 200 is in an image browsing mode, the second display may display a user interface (UI) or a graphical user interface (GUI) associated with image browsing. When the electronic device 200 is in a document editing mode, the second display may display a user interface or a graphical user interface associated with document editing. The user interface associated with document editing may include document content and a virtual keyboard for editing a document.

When superposing is performed between the second display and the touch panel in a layered manner to form a touchscreen, the second display may be used as an input apparatus and an output apparatus. The second display may include at least one of a liquid crystal display (LCD), an organic light-emitting diode (OLED) display, a three-dimensional (3D) display, or an electronic ink display.

Some of these displays can be configured to be transparent, so that external can be seen through the display. The display can be referred to as a transparent display. A representative example of the transparent display may include a transparent organic light-emitting diode (TOLED).

According to configuration of the electronic device 200, the second display may be implemented by using two or more displays. For example, a plurality of displays may be disposed on one surface in an integrated or independent manner, or be arranged on different surfaces.

The second audio output module may output, in modes such as a call signal receiving mode, a call mode, a recording mode, a voice recognition mode, and a broadcast receiving mode, audio data that is received from the second communications unit 202 or stored in the second memory 208. In addition, the second audio output module may provide audio output (such as a call signal receiving voice or a message receiving voice) related to a specific function executed by the electronic device 200. The second audio output module may include a receiver, a speaker, a buzzer, and the like.

The alarm unit outputs a signal used to notify the electronic device 200 of event occurrence. An event generated by the electronic device 200 may include call signal receiving, message receiving, key signal input, touch input, and the like. The alarm unit not only can output a video signal or an audio signal, but also can output other types of signals, such as a signal that indicates event occurrence in a vibration manner.

The tactile module generates various tactile effects that can be sensed by the user. A representative example of the tactile effects generated by the tactile module is a vibration. A strength and a mode of the tactile module can be controlled. For example, different vibrations may be output by means of combination or in order.

The second processor 212 controls a general operation of the electronic device 200. For example, the second processor 212 performs control and processing associated with telephone call, data communication, video call, multimedia data reproduction, and the like. The second processor 212 may include a multimedia module, and the multimedia module is configured to reproduce multimedia data. The multimedia module may be configured as a part of the second processor 212 or an independent component. The second processor 212 may further include a detection unit, and the detection unit is configured to detect whether the user input unit 206 or the touchscreen has input information. Similarly, the detection unit may be configured as a part of the second processor 212 or an independent component.

The second processor 212 can perform mode recognition processing to identify writing input or drawing input on the touchscreen as a text or an image.

In addition, the second processor 212 may execute a locked state when a state of the electronic device 200 meets a preset condition, to limit a control command input by a user for an application. In addition, the second processor 212 may control a locked image displayed in a locked state based on touch input sensed on the touchscreen in the locked state of the electronic device 200.

The second memory 208 may store a software program executed by the second processor 212 to process and control an operation, or may temporarily store input or output data (for example, a telephone book, a message, a static image, and a video).

The first memory 108 and the second memory 208 may be implemented by using any type of suitable storage medium. The storage medium includes a flash memory, a hard disk, a micro multimedia card, a storage card (for example, an SD or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. In addition, the head mounted display device 100 or the electronic device 200 may execute a storage function that is of the first memory 108 or the second memory 208 and that is executed by a network storage apparatus on the Internet.

The foregoing elements of the HMD 100 or the electronic device 200 may be coupled to each other by using any one or combination of buses such as a data bus, an address bus, a control bus, an extended bus, and a local bus.

Various implementations described in this specification may be implemented by using software, hardware, or any combination thereof in a computer-readable medium or a similar medium of the computer.

For hardware implementation, this embodiment described herein may be implemented by using at least one of an application-specific integrated circuit (ASIC), a digital signal processor (DSP), a digital signal processing apparatus (DSPD), a programmable logic device (PLD), a field programmable gate array (FPGA), a central processing unit (CPU), a general purpose processor, a microprocessor, or an electronic unit designed to perform the function described herein. In some cases, this embodiment may be implemented by the processor.

For software implementation, the embodiment of a program, a function, or the like described herein may be implemented by using a separate software module. Each software module may perform one or more functions or operations described herein.

Software code can be implemented by using a software application written in any suitable programming language. The software code may be stored in the first memory 108 and/or the second memory 208 and executed by the first processor 112 and/or the second processor 212.

Figure 3:
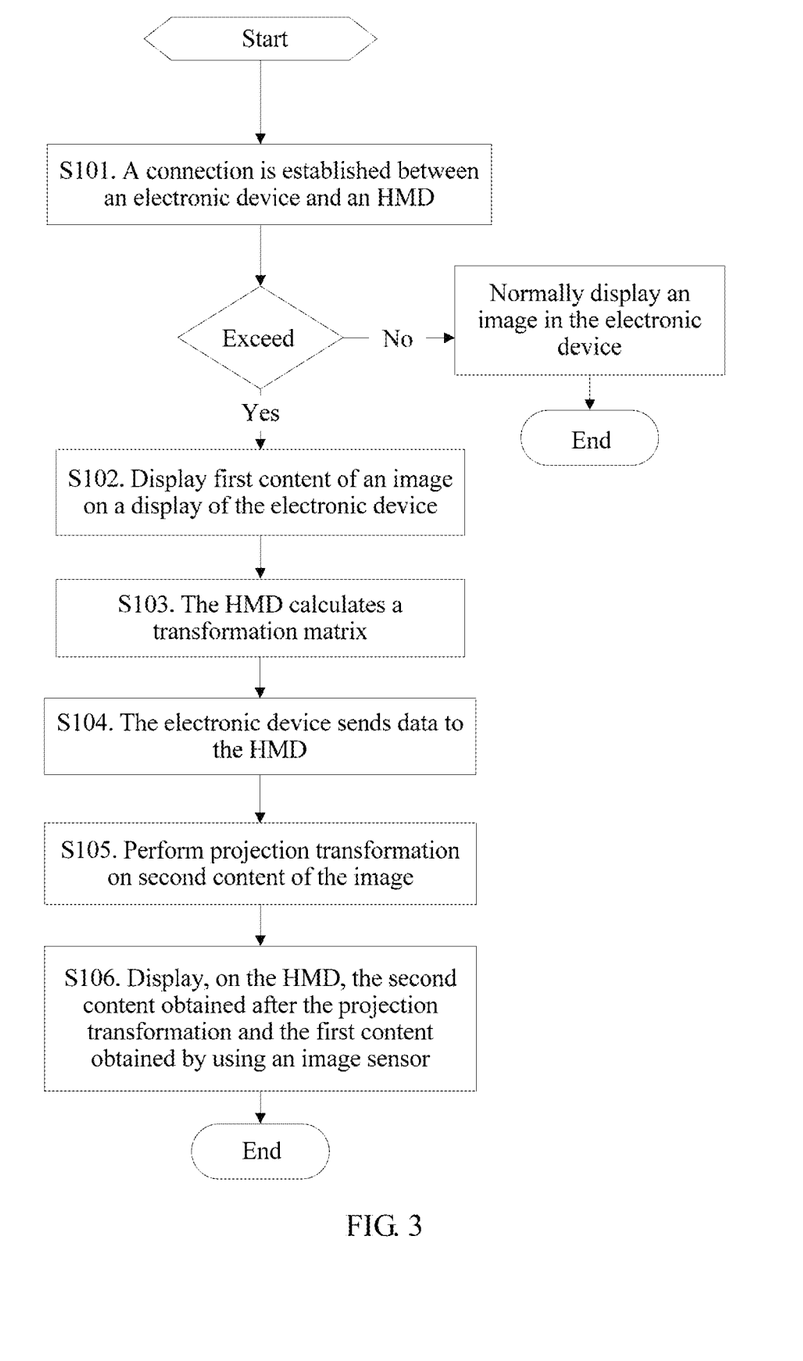
FIG. 3 is a flowchart of a method for extending a display area in an HMD according to an embodiment of the present invention.

FIG. 3 is a flowchart of a method for extending a display area of an electronic device according to an embodiment of the present invention.

Step S101: A connection is established between an electronic device and a head mounted display device, and the electronic device sends parameter information to the HMD.

Whether an image displayed on the electronic device exceeds a display of the electronic device is determined, that is, whether image resolution of the image is greater than display resolution of the display of the electronic device is determined. The image displayed on the electronic device may be an image received by the electronic device, or may be a functional interface of an application program. If the image does not exceed the display of the electronic device, the image is normally displayed on the electronic device. If the image exceeds the display of the electronic device, that is, the image resolution of the image is greater than the display resolution of the display of the electronic device, the following steps are performed.

Step S102: Display first content of an image on a display of the electronic device, where the image includes displayed first content, and further includes second content exceeding a range of the display.

Step S103: The HMD calculates a transformation matrix T of transforming a three-dimensional coordinate system of the electronic device into a three-dimensional coordinate system of the HMD.

Step S104: The electronic device sends data to the HMD, where the data includes a grayscale value of each pixel in the second content, and the electronic device may send, to the HMD, entire image data including the first content and the second content, or may send only the grayscale value of each pixel in the second content to the HMD.

Step S105: Transform, by using the transformation matrix T and a calibration matrix K, three-dimensional coordinates in the three-dimensional coordinate system of the electronic device that are of the second content exceeding the range of the display of the electronic device, to obtain two-dimensional coordinates displayed on the display of the HMD; perform, according to received grayscale value data of the second content, backward warping calculation on the two-dimensional coordinates displayed on the display of the HMD; and determine a grayscale value of each point of the second content displayed on the display of the HMD.

Step S106: The HMD obtains, by using an image sensor, the first content displayed on the display of the electronic device, and displays, on the display of the HMD, the obtained first content and second content obtained after the projection transformation.

The following describes a time sequence diagram of a method for displaying an augmented reality image according to an embodiment of the present invention. For details, refer to FIG. 4.

Figure 4:
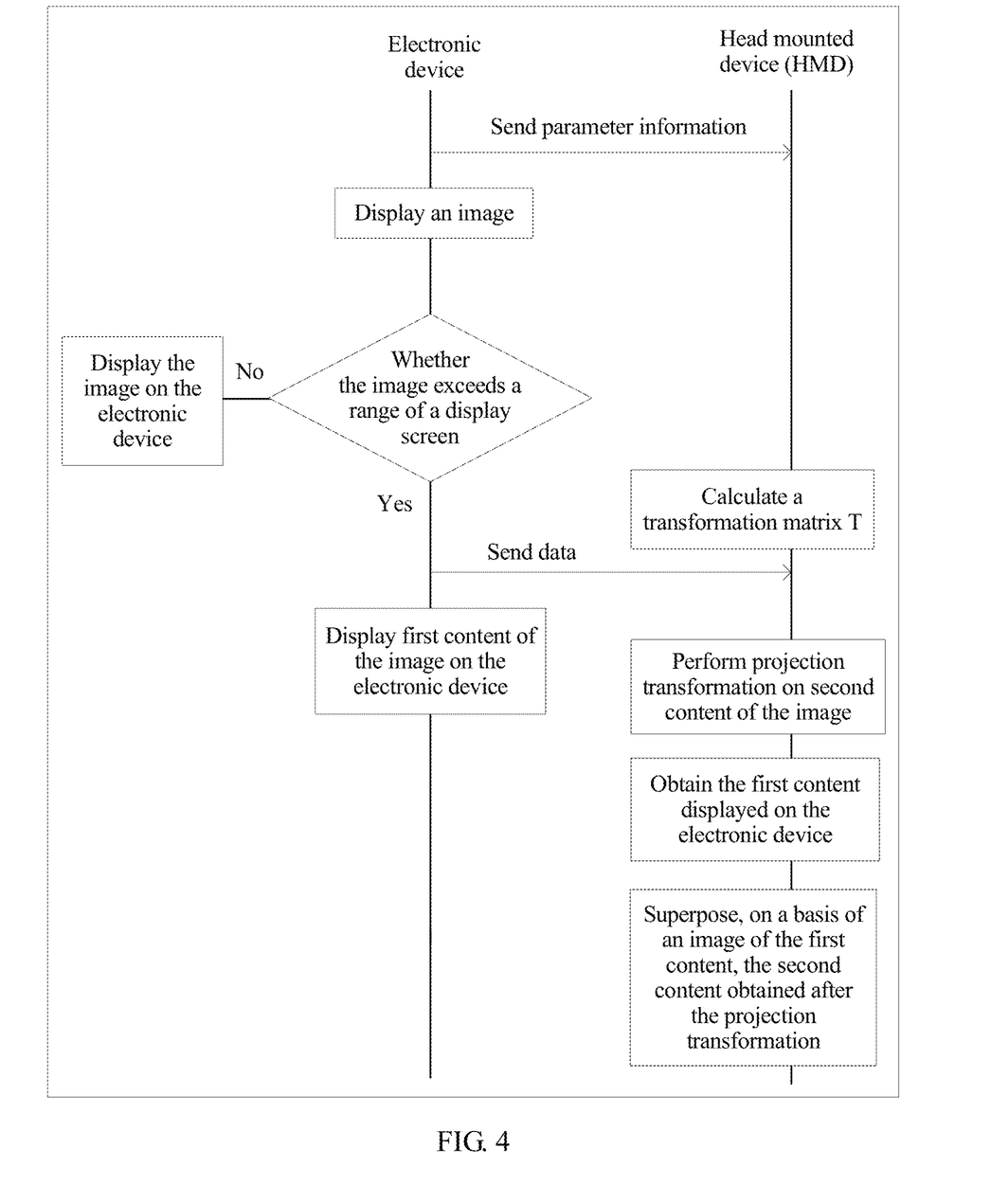
FIG. 4 is a schematic diagram of interaction between an HMD and an electronic device according to an embodiment of the present invention.

First, an electronic device sends parameter information to an HMD.

Then, when an image is displayed on the electronic device, whether the image exceeds a range of a display of the electronic device is determined. If the image does not exceed the range, the image is normally displayed in the electronic device. If the image exceeds the range, first content of the image is displayed on the electronic device, and the image further includes second content that exceeds the range of the display of the electronic device.

Then, the HMD calculates a transformation matrix T of transforming a three-dimensional coordinate system of the electronic device into a three-dimensional coordinate system of the HMD.

Then, the electronic device sends data to the HMD, and the data includes a grayscale value of each pixel in the second content.

Next, the HMD performs projection transformation and backward warping calculation on the second content according to three-dimensional coordinates of a feature point and the grayscale value.

Finally, the HMD obtains, by using an image sensor, the first content displayed on the display of the electronic device, displays the obtained first content on the display of the HMD, and superposes, on a basis of the first content, second content obtained after the projection transformation.

Optionally, before the first content and the second content are displayed on the display of the HMD, the HMD calculates, by tracking a preset feature point on the electronic device, a posture of the HMD relative to the electronic device, and adjusts display positions of the first content and the second content according to a calculation result.

In FIG. 3 and FIG. 4, a process in which the HMD calculates a transformation matrix and a process in which the electronic device sends data to the HMD are separately described. After the HMD calculates the transformation matrix, the electronic device sends the data to the HMD. Optionally, an order between an operation of calculating the transformation matrix and an operation of sending the data may change. That is, the electronic device first sends the data to the HMD, and the HMD performs an operation of calculating the transformation matrix after receiving the data. In another possible case, an operation of sending the data by the electronic device to the HMD and an operation of calculating the transformation matrix by the HMD may be simultaneously performed.

The following five embodiments are specific embodiments in different application scenarios. Map view is used as an example in a first embodiment, document editing by using an input device such as a keyboard is used as an example in a second embodiment, web page browsing is used as an example in a third embodiment, image browsing is used as an example in a fourth embodiment, and relative movement that occurs between an electronic device and an HMD is used as an example in a fifth embodiment. With reference to the first to the fifth embodiments in the following, persons skilled in the art may understand technical solutions in the embodiments of the present invention better, and the objectives, features, and advantages of the present invention may be clearer.

First Embodiment

When viewing a map on an electronic device, a user may need to magnify a part (for example, a destination) to view local details. In addition, the user further wants to obtain an overall view from a start point to a destination. Otherwise, the user can obtain only a map segment displayed according to navigation software. In particular, when the start point is far away from the destination, the user cannot see the start point neither an end point in a path. As a result, the user is easy to go a wrong way or get lost.

Figure 5:
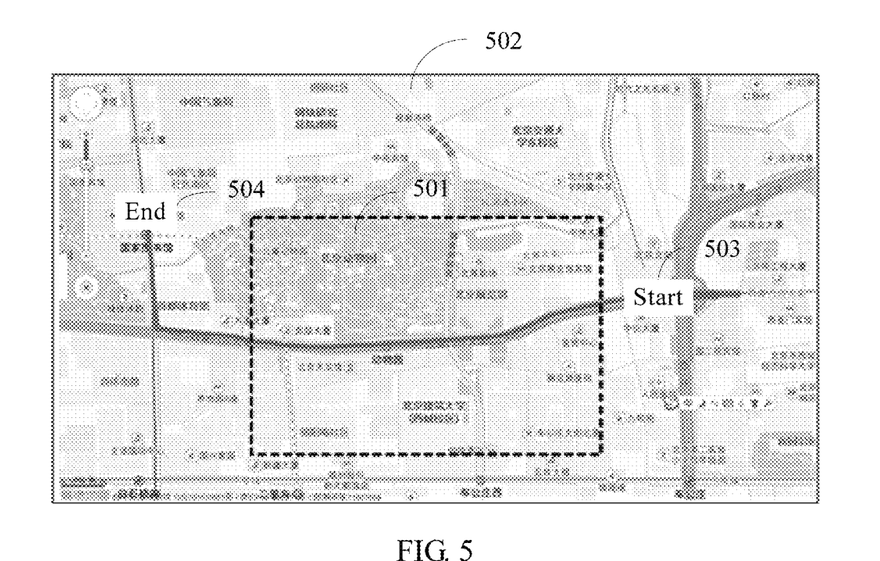
FIG. 5 is a schematic diagram of displaying a map on an HMD according to an embodiment of the present invention.

After a connection is established between the electronic device and an HMD, the electronic device first sends parameter information to the HMD. The parameter information includes a point distance of the display of the electronic device 200, a quantity of horizontal pixels on the display, a quantity of vertical pixels on the display, a definition of the three-dimensional coordinate system (including a coordinate axis direction and a location of an origin) of the electronic device, coordinates of a display center that is of the electronic device and that is in the three-dimensional coordinate system, coordinates of a preset feature point that is on the electronic device and that is in the three-dimensional coordinate system, and the like.

In the first embodiment, it is assumed that a quantity of horizontal pixels on the display is 2560, and a quantity of vertical pixels on the display is 1440. In the following description, a maximum image size supported by the display of the electronic device is 2560×1440.

As shown in FIG. 5, a user may perform a series of operations on the electronic device. In the first embodiment, the user inputs a start point 503 and an end point 504 respectively into input boxes of map software. The electronic device obtains map data between the start point 503 and the end point 504 by querying a database. In the prior art, the electronic device adjusts an image according to the maximum image size supported by the display of the electronic device, so that the start point and the end point can be both displayed on the display.

If the start point is far away from the end point, details of the image displayed on the display are lost. In this case, the user needs to scale down or drag the image displayed on the display.

The electronic device refreshes content displayed on the display by means of scaling or dragging. Before refreshing the currently displayed content, whether an image obtained after scaling or dragging exceeds the maximum image size supported by the display is first determined. If a size of an image that includes the start point and that is obtained after scaling or dragging is not greater than 2560×1440, the image obtained after scaling or dragging is normally displayed on the display. If a size of an image that includes the start point and that is obtained after scaling or dragging is greater than 2560×1440, first content 501 of the image is displayed on the display according to the scaling or dragging, and image resolution of the first content 501 is equal to display resolution 2560×1440 of the display.

The image that includes the start point and that is obtained after scaling or dragging not only includes the first content 501 displayed on the display, but also includes second content 502 (a part exceeding the range of the display) that is not displayed on the display.

The electronic device sends grayscale value data of each pixel in the second content 502 to the HMD.

The HMD calculates, according to the three-dimensional coordinates of the preset feature point by means of projection transformation, coordinates of each pixel that is in the part 502 (the second content) exceeding the range of the display of the electronic device and that is on the display of the HMD, performs backward warping calculation on each pixel according to received grayscale value data, and obtains, by means of backward warping calculation, a grayscale value of each pixel that is in the second content 502 and that is in a two-dimensional image displayed on the display of the HMD.

The HMD obtains, by using an image sensor, the first content 501 displayed on the display of the electronic device, displays an image of the obtained first content 501 on the display of the HMD, and superposes, on a basis of the image of the first content 501, the second content 502 obtained after the projection transformation.

Second Embodiment

Figure 6:
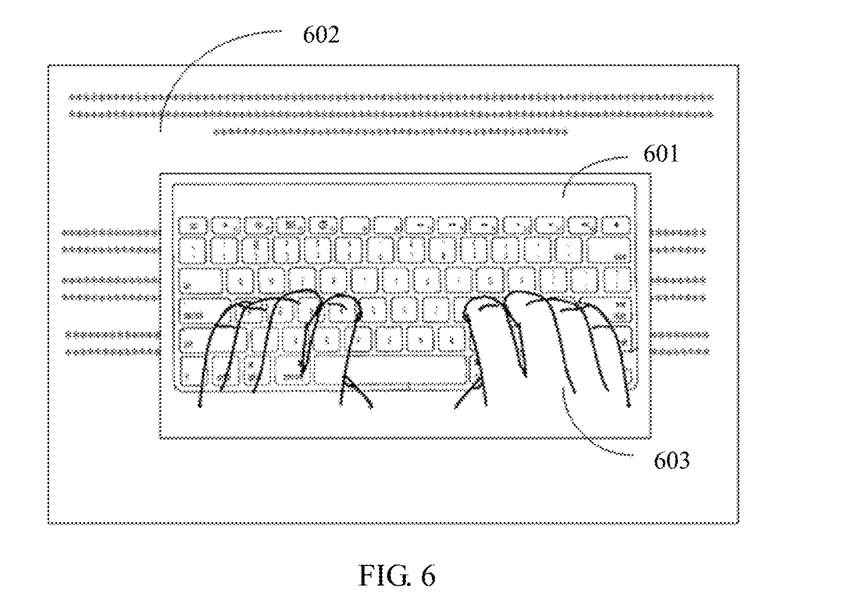
FIG. 6 is a schematic diagram of displaying a document and a virtual keyboard on an HMD according to an embodiment of the present invention.

In the second embodiment, a document may be displayed on a display of the electronic device, and a user may edit the document by using a user input unit (for example, a virtual keyboard displayed on a touchscreen) in the electronic device. When document content is relatively large, it is desirable to display document content as much as possible, so that the user can view more content before a currently editing part at any time when editing the document.

As shown in FIG. 6, in the second embodiment, a virtual keyboard 601 used to edit the document is displayed on the display of the electronic device. The second content that is not displayed on the display of the electronic device is a document 602. The image includes the virtual keyboard 601 and the document 602, and image resolution of the image is greater than display resolution of the display of the electronic device.

In the second embodiment, a magnified virtual keyboard may be displayed by using an entire display screen of the electronic device. Compared with a virtual keyboard displayed on a current smartphone, the magnified virtual keyboard has a larger key area, so that the user may operate the virtual keyboard 601 with two hands.

The electronic device sends the document 602 to the HMD, and the HMD performs projection transformation on the document 602. The HMD obtains the virtual keyboard 601 displayed on the display of the electronic device, and displays, on the display of the HMD, the virtual keyboard 601 and the document 602 obtained after the projection transformation.

Optionally, in addition to the virtual keyboard 601, a part of the document is further displayed on the display of the electronic device.

Optionally, the HMD obtains, by using an image sensor, the virtual keyboard 601 displayed on the electronic device and a user finger 603. The electronic device sends, to the HMD in real time according to an operation performed by the user finger 603 on the virtual keyboard 601, document content edited by the user. The HMD performs projection transformation on the document content, so as to modify, in real time, content of the document 602 displayed on the HMD.

Third Embodiment

In the third embodiment, a web page may be normally browsed on a display of an electronic device, and a web page on a screen does not need to be frequently dragged.

Similar to the foregoing embodiment, the electronic device determines whether image resolution of a web page image is greater than display resolution of the display. If the image resolution of the web page is not greater than the display resolution, the web page is normally displayed on the display. If the image resolution of the web page is greater than the display resolution, first content of the web page is displayed on the display, and image resolution of the first content is equal to the display resolution of the display. The second content exceeding a range of the display includes other content of the web page.

Projection transformation is performed on the other content of the web page. A grayscale value of projection that is of each pixel in the other content of the web page and that is in a two-dimensional image of the HMD is obtained by means of backward warping calculation.

The HMD obtains, by using an image sensor, an image of the first content displayed on the electronic device, displays an image of the obtained first content on the display of the HMD, and superposes, on a basis of the image of the first content, the second content obtained after the projection transformation. Therefore, the user views specific content clearly in a web page image presented in an entire visual field, and relatively more web page content can be displayed.

Fourth Embodiment

In the fourth embodiment, a high-resolution image may be displayed on a display of an electronic device.

It is assumed that display resolution of the display of the electronic device display is 2560×1440, and image resolution of the image is 3200×2400.

In this assumed case of this embodiment, the image resolution of the image is greater than the display resolution, first content of the image is displayed on the display, and the image resolution of the first content is equal to the display resolution 2560×1440 of the display. The high-resolution image further includes second content exceeding the range of the display.

Projection transformation is performed on the second content of the image, and a grayscale value of projection that is of each pixel in the second content of the image and that is in a two-dimensional image of the HMD is obtained by means of backward warping calculation.

The HMD obtains, by using an image sensor, an image of the first content displayed on the electronic device, displays the image of the obtained first content on the display of the HMD, and superposes, on a basis of the image of the first content, an image of the second content obtained after the projection transformation. Therefore, for the user, an image with 3200×2400 image resolution may be all presented on the display of the HMD.

Fifth Embodiment

In the foregoing first to fourth embodiments, a method for extending a display area of an electronic device in an HMD when content (a map, a document, a web page, and an image) displayed on a display of the electronic device is greater than display resolution is described.

The display of the electronic device can display not only a static image but also a dynamic image. The dynamic image may be formed by a plurality of static images. A dynamic display effect is implemented by continuously displaying the plurality of static images at a specific refresh frequency. Correspondingly, the electronic device continuously sends data to the HMD according to a predetermined time interval, and the HMD calculates received data, and adjusts, in real time, content displayed on the HMD, so that the HMD can display the dynamic image.

When relative locations of the electronic device and the HMD change, the HMD tracks a preset feature point on the electronic device by using an image sensor, calculates a posture of the image sensor of the HMD relative to the display of the electronic device, and performs, according to a change of first content displayed on the electronic device, projection transformation on a remaining part exceeding a range of the display of the electronic device. Therefore, for a user, an image presented in an entire visual field moves with the electronic device.

Optionally, relative location change of the electronic device and the HMD includes relative panning and relative rotation.

Method steps described in combination with the content disclosed in the present invention may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

Persons skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solution of the present invention shall fall within the protection scope of the present invention.

What is claimed is:

1. A method, applied to a head mounted display device with a first display and an image sensor, wherein the method comprises:
   establishing a connection to an electronic device, wherein the electronic device has a second display, a defined three-dimensional coordinate system, and a feature point that has known three-dimensional coordinates in the three-dimensional coordinate system, wherein the second display displays first content of an image, wherein image resolution of the image is greater than display resolution of the second display, and wherein the image further comprises second content that exceeds a range of the second display and that is not displayed on the second display;
   receiving data sent by the electronic device, wherein the data comprises a grayscale value of each pixel in the second content;
   performing projection transformation on the second content according to the three-dimensional coordinates of the feature point and the grayscale value;
   obtaining, by using the image sensor, the first content displayed on the second display; and
   displaying, on the first display of the head mounted display device, the obtained first content and the second content obtained after the projection transformation.

2. The method according to claim 1, further comprising, before the first content and the second content are displayed on the first display of the head mounted display device:
   tracking the feature point; and
   calculating a posture of the image sensor relative to the second display.

3. The method according to claim 1, wherein the image comprises a document and a virtual keyboard used to edit the document.

4. The method according to claim 1, wherein the image comprises a static image or a dynamic image.

5. The method according to claim 1, wherein the image is a web page and the electronic device comprises a smartwatch.

6. A head-mounted display device, comprising:
   a first display;
   an image sensor;
   a memory comprising instructions; and at least one processor coupled to the memory, the instructions being executed by the at least one processor to cause the head-mounted display device to be configured to:

establish a connection to an electronic device, wherein the electronic device has a second display, a defined three-dimensional coordinate system, and a feature point that has known three-dimensional coordinates in the three-dimensional coordinate system, wherein the second display displays first content of an image, wherein image resolution of the image is greater than display resolution of the second display, and wherein the image further comprises second content that exceeds a range of the second display and that is not displayed on the second display;

receive data sent by the electronic device, wherein the data comprises a grayscale value of each pixel in the second content;

perform projection transformation on the second content according to the three- dimensional coordinates of the feature point and the grayscale value;

obtain, by using the image sensor, the first content displayed on the second display; and display, on the first display of the head mounted display device, the obtained first content and the second content obtained after the projection transformation.

7. The head-mounted display device of claim 6, the instructions further cause the head-mounted display device to:

track the feature point; and calculate a posture of the image sensor relative to the second display.

8. The head-mounted display device of claim 6, wherein the image comprises a document and a virtual keyboard used to edit the document.

9. The head-mounted display device of claim 6, wherein the image comprises a static image or a dynamic image.

10. The head-mounted display device of claim 6, wherein the image is a web page and the electronic device comprises a smartwatch.

* * * * *

UNITED STATES PATENT AND TRADEMARK OFFICE
CERTIFICATE OF CORRECTION

PATENT NO. : 10,672,149 B2
APPLICATION NO. : 16/311311
DATED : June 2, 2020
INVENTOR(S) : Xin Chen and Wenmei Gao

Page 1 of 1

It is certified that error appears in the above-identified patent and that said Letters Patent is hereby corrected as shown below:

In the Claims

In Column 19, Line 20, in Claim 6, delete "three- dimensional" and insert -- three-dimensional --, therefor.

Signed and Sealed this
Fourteenth Day of July, 2020

Andrei Iancu
*Director of the United States Patent and Trademark Office*